United States Patent
McCarthy

(10) Patent No.: US 11,555,794 B1
(45) Date of Patent: Jan. 17, 2023

(54) METHOD OF LOCATING POLES ON BEARING ELEMENTS

(71) Applicant: Schaeffler Technologies AG & Co. KG, Herzogenaurach (DE)

(72) Inventor: Scott McCarthy, Seaforth (CA)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 17/539,806

(22) Filed: Dec. 1, 2021

(51) Int. Cl.
*G01N 23/207* (2018.01)
*G01M 13/04* (2019.01)

(52) U.S. Cl.
CPC .......... *G01N 23/207* (2013.01); *G01M 13/04* (2013.01)

(58) Field of Classification Search
CPC .............................. G01N 23/207; G01M 13/04
See application file for complete search history.

(56) References Cited

U.S. PATENT DOCUMENTS

| | | | |
|---|---|---|---|
| 2003/0196735 A1* | 10/2003 | Sugiura | C22C 38/12 148/602 |
| 2017/0370860 A1* | 12/2017 | Konaka | G01N 23/20008 |
| 2022/0034826 A1* | 2/2022 | Pineault | G01N 23/20025 |

OTHER PUBLICATIONS

"Mapping Residual Stress Distributions in Ball Bearings via X-Ray Diffraction Techniques," Webpage <https://mfn.li/archive/issue_view.php?id=2066>; MFN Metal Finishing News; 3 Pages; Nov. 2020.

* cited by examiner

*Primary Examiner* — David P Porta
*Assistant Examiner* — Mamadou Faye
(74) *Attorney, Agent, or Firm* — Volpe Koenig

(57) ABSTRACT

A method of identifying at least one pole location on a bearing element formed from a metal source element. The method is non-destructive and does not alter the surface of the bearing element. The method includes applying X-rays to a plurality of regions of a bearing element, and measuring diffracted intensity values of X-ray diffraction vectors or bi-sectors at the plurality of regions. The method includes determining at least one pole location on the bearing element based on the diffracted intensity values.

19 Claims, 4 Drawing Sheets

US 11,555,794 B1

METHOD OF LOCATING POLES ON BEARING ELEMENTS

FIELD OF INVENTION

The present disclosure is directed to analysis of bearing elements, and is more particularly related to identifying poles of bearing elements.

BACKGROUND

It is well known that bearing elements, such as ball bearings, can be formed from a source material in a rod form. The bearing elements formed from the rod will have particular characteristics due to the inherent characteristics or properties of the source material. One known type of material for forming bearing elements is steel.

Due to the forging associated with forming bearing elements from a rod or cylinder of source material, there will inherently be certain characteristics or features in the bearing element. Poles manifest on the formed bearing elements in specific regions. These poles are critical because failure is more common at these locations on the bearing elements. Accordingly, it is desirable to have the ability to identify the location of poles. Known techniques for identifying poles on bearing elements are either destructive or time consuming. For example, one known type of inspection of bearing elements requires boiling the bearing elements in an acid bath, which modifies the surface of the bearing elements. Other analysis methods include scratching the bearing element to create a known modification in residual stress at a specific location, which can then be used to aid in creating a residual stress map.

Accordingly, there is a need to provide a reliable and non-destructive technique for identifying the pole locations on bearing elements.

SUMMARY

A method of identifying at least one pole location on a bearing element formed from a metal source element is provided herein. The method includes mounting a bearing element in a diffractometer assembly. The method includes applying a predetermined X-ray beam to a plurality of regions of the bearing element via an X-ray source, and measuring diffracted intensity values of X-ray diffraction vectors from the X-ray beam at the plurality of regions via a detector. The method includes determining at least one pole location on the bearing element based on the diffracted intensity values.

In one aspect, the X-ray beam is applied to the surface of the bearing element and reflected as X-ray diffraction vectors. The diffraction vector is the bisector of the incident beam and diffracted beam vectors. The atomic crystallographic planes responsible for diffraction are perpendicular to the diffraction vector.

In one aspect, the X-ray diffraction vector is oriented in a normal orientation relative to the plurality of regions of the bearing element. The method can further comprise determining at least one pole location based on a lowermost diffracted intensity value of the diffracted intensity values.

The diffracted intensity values can be measured through a depth of at least 1 micron from an outer surface of the bearing element and less than 8 microns from the outer surface of the bearing element. The X-ray depth of penetration will vary depending on the X-ray wavelength, sample properties and diffraction vector angle relative to the sample. The plurality of regions can include at least 60 regions and less than 360 regions.

The method can further comprise applying an initial marking to the bearing element prior to the XRD. The method can also further comprise rotating the bearing element in a predetermined pattern during the XRD.

The method further comprises mapping the diffracted intensity values at the plurality of regions onto a model of the bearing element, wherein a lowest diffracted intensity value corresponds to the at least one pole location. The method can further comprise marking the bearing element in a location corresponding to the lowest diffracted intensity value mapped on the model of the bearing element.

The method further comprises, in one aspect, mapping only a first half of the bearing element to identify a first pole on the bearing element and then determining or locating the second pole based on the mapping of the first half of the bearing element.

The diffracted intensity values can be measured as at least one of an integrated value or a peak intensity value.

The bearing element remains completely undamaged and intact during the processes disclosed herein. The method does not require any destructive treatment, processes, or steps.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
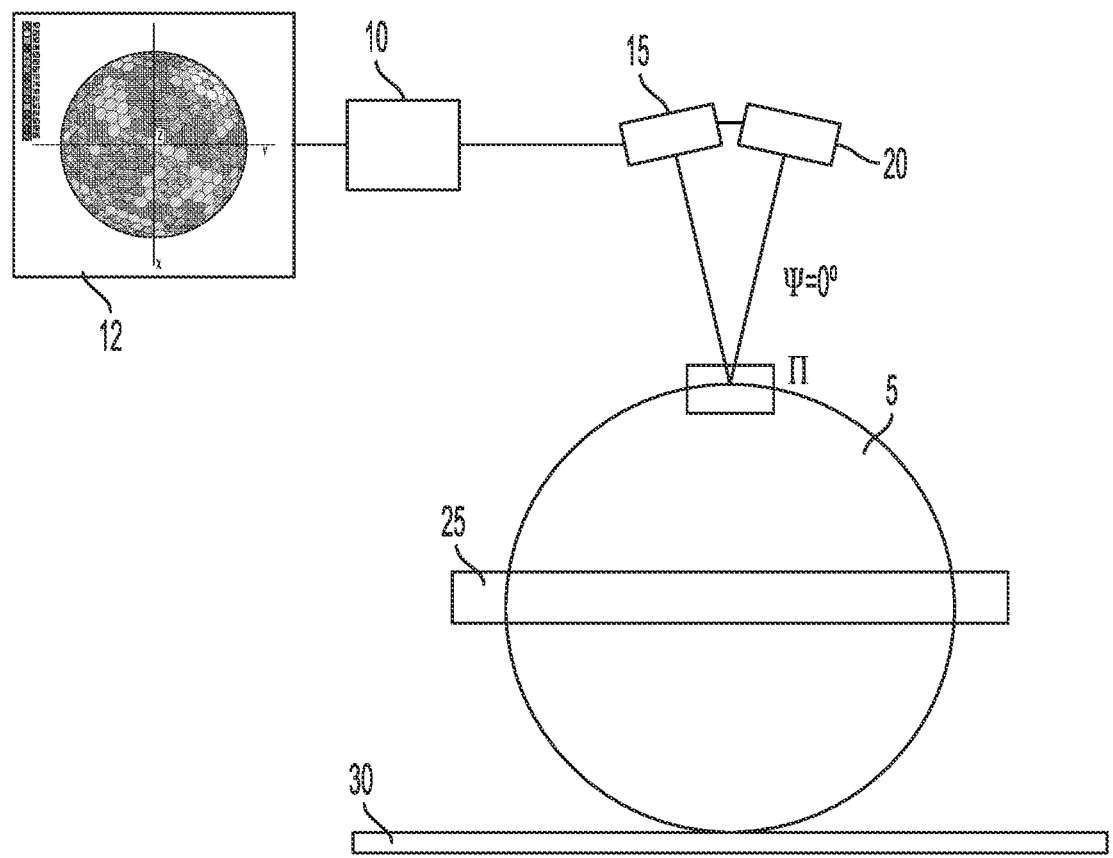
FIG. 1 is an exemplary system for analyzing a bearing element.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

XRD is a technique in which X-rays are absorbed and re-emitted from a repeating atomic structure, such as those found in crystal structures. XRD occurs according to Bragg's law: $n\lambda=2d\sin\theta$, where $\lambda$ is the x-ray wavelength, n is an integer, d is the atomic spacing and $2\theta$ is the angle at which maximum diffraction occurs. Using this equation, samples comprised of known phases will produce a predictable XRD pattern with a particular X-ray wavelength.

The repeating planes in crystals are identified by their Miller indices, which is a three-number notation known as {h k l}. A common plane diffracted in steel is the {2 1 1} plane. Specific wavelengths are generated by an X-ray tube source. The wavelengths depend on the target element in the X-ray tube. For example, with respect to steel, a Cr target is commonly used which generates a specific x-ray wavelength of ~0.2291 nm. Using a known X-ray wavelength and measuring the angle of diffraction, the atomic spacing can be calculated using Bragg's law.

In one aspect, the diffraction profile is the shape of a peak because diffraction occurs to a lesser extent away from the Bragg angle. The intensity of the diffraction peak is dependent on many factors, including the number of planes present in the crystal structure of the analyzed element or sample. In general, larger crystals will contain more planes and produce a stronger diffraction peak.

XRD occurs when the crystal plane is properly aligned to a source and a detector. If the crystals within the sample, such as a bearing element, have random orientations and enough crystals are sampled, then diffraction will occur at any orientation to the sample as there will always be crystals present with the correct orientation to diffract. Samples in which the crystals are not all randomly oriented are said to have a crystallographic texture. In this case, the crystals will tend to align with a particular direction, or particular directions. This can have a significant effect on material properties, such as causing material to be weaker in a particular direction. XRD can be used to identify crystal texture but requires measurement of many orientations to the sample using many {hkl} planes making it a complex and time-consuming process.

Bearing elements, such as ball bearings, are typically manufactured from a rod stock. This rod stock tends to have what is known as a "fiber texture" due to the way in which the steel is formed into a rod during the forging process. The steel rod will have different properties with particular orientations, so it is critical to be able to determine the orientation.

Once the bearing element reaches the final finishing stages of manufacturing, the orientation from the rod stock to the finished bearing element cannot be detected or determined by visual inspection. The effects of known textures on XRD peak intensity can be simulated for a particular {hkl} plane. The effects of fiber texture on the {211} plane in the fiber direction can show a low intensity in the center with a high intensity ring further away from the center, in one aspect.

In one aspect, a method of identifying pole locations on a bearing element is provided. The bearing element can be formed from a metallic source material, such as a steel rod. One of ordinary skill in the art would understand from this disclosure that the bearing element could be formed from other metallic materials. The bearing elements can be formed from a cylindrical rod steel component, and can be machined to a ball bearing or spherical rolling element. The method generally comprises analyzing the bearing element to identify specific characteristics based on the formation and machining techniques used to form the bearing element.

The method can include mounting the bearing element in a diffractometer. In one aspect, the diffractometer generally includes a support or rig, an X-ray source, a detector, and computer system. In one aspect, the X-ray source is an X-ray tube configured to direct X-ray energy, rays, or beams towards a sample, such as a bearing element. Scattering of reflected X-rays (i.e. diffraction vectors) by the atoms within the bearing element are then detected by the detector. An exemplary diffractometer system or assembly is shown in FIG. 1 for analyzing a bearing element 5. For example, the hardware can include the Proto Manufacturing Limited LXRD® diffractometer with mapping stage and ball mapping adapter. The software used for data collection can be Proto Manufacturing Limited's XRDWin® 2.0, in one example. The software for viewing the maps can be Proto Manufacturing Limited's 3D mapping program "3Dmap.exe," in one example.

As shown in FIG. 1, the bearing element 5 is supported by a holding assembly or apparatus 25. The holding assembly 25 can be configured to hold the bearing element 5 in a fixed position while undergoing XRD.

In another aspect, the holding assembly can include a plurality of robotic arms or positioning elements. For example, a six-axis robotic arm assembly could be used to map a bearing element by positioning the source and detector around a stationary bearing element.

In order to position the bearing element 5 in different configurations, an adjustment assembly 30 can be provided. In one aspect, the adjustment assembly 30 is configured to move in the X and Y direction to rotate the bearing element 5 while being held by the holding assembly 25. As shown above the bearing element 5, an X-ray source 15 and a detector 20 are provided. The X-ray source 15 is configured to direct X-rays towards a specific location on the bearing element 5. In one aspect, a chromium X-ray source can be configured to emit k-alpha wavelengths of a predetermined length, such as 0.229 nm, which is used for diffraction. One of ordinary skill in the art would understand that other types of wavelengths could be used. The X-ray source or tube can be configured to be run at various levels. For example, the X-ray source or tube can be configured to run at 30 kilovolts and 25 milliamps for a power of 750 Watts. A detector filter, such as a Vanadium detector filter, can be used to suppress any possible k-beta wavelengths.

The detector 20 is configured to sense or detect reflections of X-ray diffraction vectors from the bearing element 5. The X-ray source 15 is generally configured to send a focused beam of X-rays towards the sample and does so via an X-ray tube source configuration. The beam size can be adjusted or limited by an aperture that is of appropriate size for the XRD configuration. The detector 20 is configured to sense the diffracted X-rays. In one aspect, the detector 20 senses the diffracted X-rays via a linear detector with 512 channels or pixels. One of ordinary skill in the art would understand that various types of sources and detectors could be used. During exposure, the number of photons detected are counted for each channel resulting in a two-dimensional data set of counts versus angle (i.e. two-theta). The detector 20 is configured to convert X-ray photons encountered to a detectable electrical signal that may be analyzed, assessed, and counted by hardware and/or software, i.e. a computer.

A central processing unit (CPU) or computer 10 is configured to communicate with the X-ray source 15 and the detector 20. In one aspect, the computer 10 can include a memory unit, processor, and interface elements (such as a mouse, keyboard, or other input means). Other electronic components can be integrated with the computer 10. The computer 10 can be configured to run software programs, such as analysis and mapping programs. Various processing modules, software programs, and other applications can be run on the computer. A monitor or display component 12 is also provided that is connected to the computer 10. The monitor 12 is configured to display mapping or models associated with the bearing element 5. In one aspect, the computer 10 is configured to provide control of the diffraction measurement setup, including parameters regarding axis positioning, detector control and X-ray source control.

For ball mapping, an image or mapping file can be generated by the computer which generally provides locational information, such as the x and y coordinates, in order to achieve ball mapping positions and a radius or diameter value for the bearing element. This information is then stored, such as in an imaging or mapping file, and can be accessed for further processing. After furthering measuring and analysis, the computer can be configured to generate mapping files or images that can be viewed on a monitor by a user. In one aspect, the mapping information can include at least one or two ball mapping setups, slices (i.e. global slices), as well as an icosahedron or other polygonal view of the bearing element. A user can adjust mapping points by adjusting a number of slices of the bearing element.

The method includes applying an X-ray beam, via the X-ray source 15, to a plurality of regions of the bearing element 5. The X-ray beam is applied in a predetermined manner, strength, configuration, etc., in one aspect. The method also includes measuring diffracted intensity values (i.e. via the diffraction vectors) at the plurality of regions via the detector 20. The method includes determining the pole locations on the bearing element based on the diffracted intensity values. The computer 10 is configured to receive signals associated with the diffracted intensity values from the detector 20. The computer 10 is configured to process the signals and generate a mapping or model that is representative of the diffracted intensity values.

The X-ray beam diffraction vectors are applied in a normal orientation or perpendicular orientation relative to the bearing element 5, in one embodiment. The diffraction vector is the bisector of the incident X-ray beam (i.e. from the source) and diffracted X-ray beam (i.e. reflected from the bearing element). The diffracted crystallographic planes are normal to this vector. The diffracted intensity is measured using a diffraction vector normal to the bearing element surface, also known as psi ($\Psi$)=0°, at each location. The greater number of atomic planes that are present, then the larger the diffracted peak intensity will be. Intensity may be measured as integrated (i.e. area under the curve) or peak intensity (i.e. highest point or absolute value). The incident X-ray beam, diffracted or reflected X-ray beam, and their bisector may all be considered by their direction, or vector in three-dimensional space.

In one embodiment, the pole locations correspond to areas or regions of the bearing element 5 having the lowest diffracted intensity values. In one aspect, the poles can correspond to the highest diffracted intensity values. One of ordinary skill in the art would understand that the diffracted intensity values can be interpreted as corresponding to various regions of the bearing element 5, depending on plane configurations.

The diffracted intensity values can be measured to a depth of at least 1 micron into the bearing element 5. In another aspect, the diffracted intensity values are measured to a depth of at least 4 microns. The measured diffracted intensity values can be measured to a depth of less than 8 microns from an outer surface of the bearing element 5.

The X-ray diffraction vectors can be measured at at least 60 different areas or regions of the bearing element 5, in one aspect. In another aspect, the X-ray diffraction vectors are measured at at least 180 regions. The X-ray diffraction vectors can be measured at less than 360 regions, in one embodiment. In one example, a bearing element having a 28.0 mm diameter can be measured at 180 points to map a top hemisphere of the bearing element. In one aspect, this process takes roughly 30 minutes. In another aspect, locating the poles of the bearing element 5 according to the method disclosed herein takes less than 30 minutes.

In one aspect, a map of the top hemisphere can be used to determine the pole location on the lower hemisphere. For example, a first pole on the top hemisphere can be determined during the initial mapping step, and a second pole on the bottom hemisphere can be located or identified as being diametrically opposed to the first pole. The method can therefore include only mapping a first half of the bearing element 5 via XRD, and then projecting values or characteristics on a model of the bearing element 5 for the other half based on the detected values from the first half of the bearing element 5.

The method can further comprise applying an initial marking to the bearing element 5 prior to measuring X-ray diffraction vectors of the bearing element. This initial marking can be used as a reference point for the bearing element 5 that is later referred to when mapping the poles on the bearing element 5.

The method includes rotating the bearing element 5 in a predetermined manner or pattern and measure X-ray diffraction vectors of the bearing element 5 after the bearing element 5 is moved. The bearing element 5 can be rotated or otherwise moved while being supported in the holding assembly 25 and the adjustment assembly 30 moves or adjusts the bearing element 5.

Figure 3:
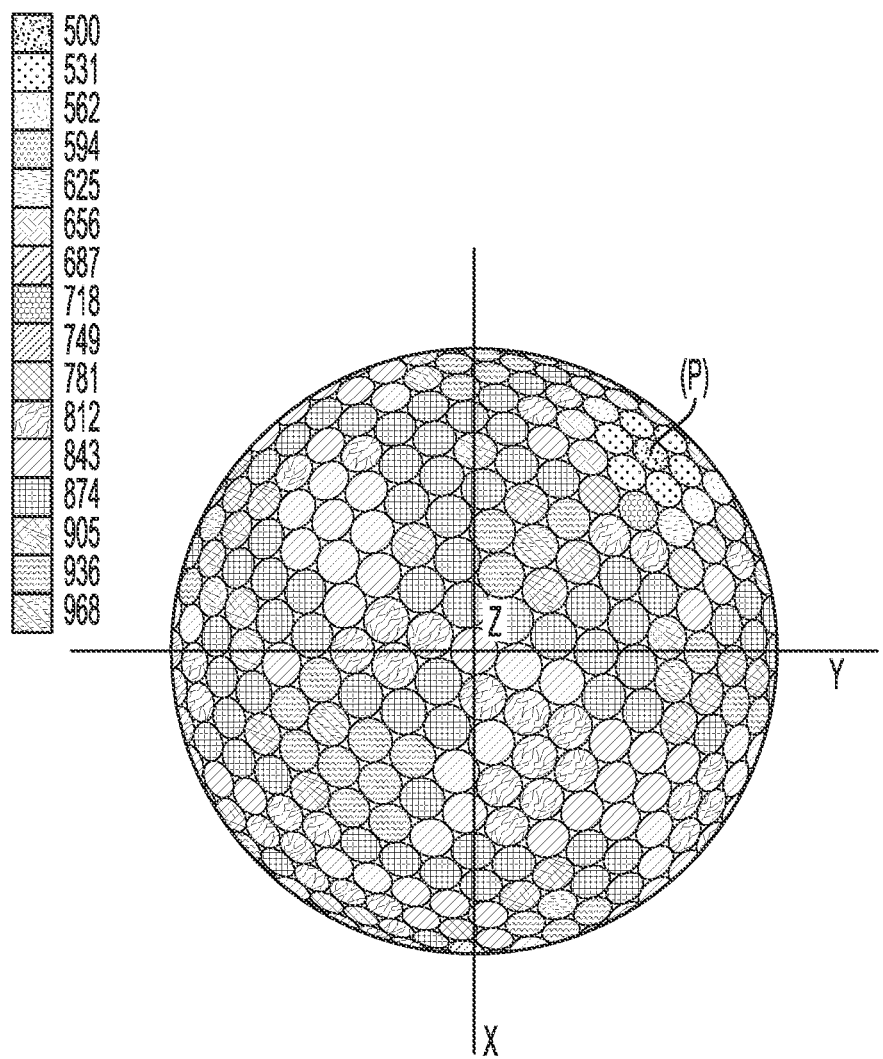
FIG. 3 is an exemplary map of a bearing element showing various diffracted intensity values.

After detecting a plurality of diffracted intensity values, the diffracted intensity values at the plurality of regions are mapped onto a model of the bearing element 5, such as shown on the monitor 12 in FIG. 1 and shown in more detail in FIG. 3. The mapping software can be configured to display the measured intensities according to a color gradient on a 3D model that may be rotated by the user. Low and high intensity regions can be identified by the color gradients.

As shown in FIG. 3, a model of the bearing element is provided. The model shows a variety of diffracted intensity values for the bearing element. A legend is provided that shows a variety of different values corresponding to a specific color, shading, pattern, or other visual indicia. In one aspect, the diffracted intensity values range from roughly 500 to 1000 integrated intensity values in counts. As used in this context, the term "count" refers to a number or quantity of photons that are detected by the channels or pixels of the detector. One of ordinary skill in the art would understand that different quantitative measurements can be used to correspond to a low or high diffraction intensity value. As shown in FIG. 3, a pole location (P) corresponds to a lowermost diffracted intensity value.

The mapping technique can automatically identify poles of the bearing elements 5 as corresponding to the two lowest diffracted intensity values that were detected. For example, in one aspect, the method includes setting a predetermined threshold for a diffracted intensity value. If the detected values are above the predetermined threshold, then the pole location can be found in a faster manner instead of waiting to map an entire hemisphere or half of the bearing element. The processor can be configured perform the comparison between the detected values and a predetermined threshold value. If the measured diffracted intensity value exceeds the predetermined threshold, then a corresponding area on the bearing element mapping or model is labeled as a pole.

The method can include subsequently marking the bearing element 5 in regions corresponding to the two lowest diffracted intensity values mapped on the model of the bearing element 5. This marking can be used to visually show the poles on the bearing element 5.

In one aspect, the diffracted intensity values are measured as an integrated value. In other words, the diffracted intensity values correspond to an area measured under a curve of the diffracted intensity value. In another aspect, the diffracted intensity value can correspond to peak intensity values (i.e. absolute values instead of the area under the curve of values).

Figure 2:
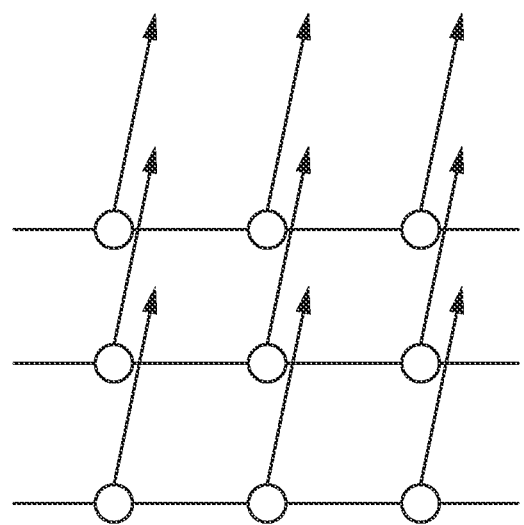
FIG. 2 is a schematic view of region II from FIG. 1 showing XRD for various planes of the bearing element.

In one aspect, the X-ray diffraction vectors are configured to diffract off of a {211} crystallographic plane of the bearing element 5. One of ordinary skill in the art would understand that the planes can vary. A Cr X-ray tube can be used for diffracting off the {211} crystallographic plane of the steel of the bearing element 5. The fiber texture caused by the initial rod stock manufacturing causes the {211} plane peak to be weaker at the bearing element poles when $\Psi=0°$. One of ordinary skill in the art would understand that other tube-plane combinations can be used, however the peak intensity pattern could be different. For example, the pole intensity may be stronger at the poles or consist of more complex intensity patterns. In one example, as shown in FIG. 2, there are three planes of atoms, which generate nine diffraction reflections.

The steps and method disclosed herein provide a way to non-destructively identify the pole locations on a bearing element. The steps and method do not require any surface modifications, such as scratching or acid baths, to analyze the bearing element or identify structural characteristics of the bearing element.

In one aspect, the measured diffracted intensity values can also provide information regarding grain flow, strength, and orientation of atoms or planes of crystals in the bearing element. For example, the comparison of the highest and lowest intensity can indicate the strength of the grain flow which can greatly influence material strength with direction. A particular direction and strength of grain flow may be detrimental or beneficial to the lifespan of a bearing component.

Figure 4:
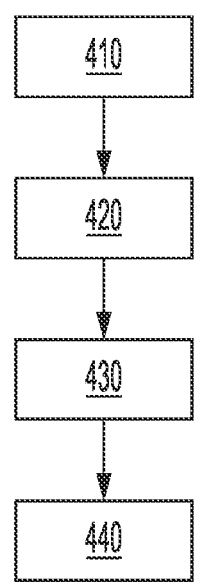
FIG. 4 is an exemplary flow chart according to one method of the present disclosure.

FIG. 4 shows a flowchart of a method of one aspect of the present disclosure. The method provides one aspect for identifying at least one pole location on a bearing element formed from a metal source element. The method includes step 410, which can include mounting a bearing element in a diffractometer assembly. Step 420 includes applying X-rays to a plurality of regions of the bearing element via an X-ray source. Step 430 includes measuring diffracted intensity values of X-ray diffraction vectors at the plurality of regions via a detector. Finally, step 440 includes determining at least one pole location on the bearing element based on the diffracted intensity values. After step 430, the diffracted intensity values can be mapped to a model of the bearing element, such as via a mapping software program or interface. The various diffracted intensity values can be shown as gradients of color, in one aspect. In another aspect, patterns of hatching or textures can be used to show the various values on the mapped model. A user can then quickly identify areas of the model having a lowest or lowermost diffracted intensity value. The user can then manually mark the bearing element in a region corresponding to the area shown in the model with the lowest diffracted intensity value. One of ordinary skill in the art would recognize that various other steps could be implemented.

Based on the analysis of the bearing element above, further analysis and action can be taken. For example, once the pole locations are identified, an additional array or spectrum of testing can be performed. The bearing element can undergo residual stress measurement testing based on the information regarding the pole locations. Once the pole locations have already been identified, a more targeted residual stress testing and analysis can be performed. Once the pole locations are known, the grain flow can also be determined, which is beneficial for inspection techniques such as microscopic analysis where the sample must be sectioned with a particular orientation to the grain flow. Traditional methods of grain flow analysis such as etching are destructive and remove material which can no longer be inspected. Using the method and steps disclosed herein, full bearing element samples may be inspected with a known grain flow orientation. This method also reveals information about grain flow intensity in addition to direction which may be influential to the lifespan of the bearing element. Intensity mapping, such as the mapping described herein, for the bearing elements may also be performed at various stages of life and used as a method of tracking changes in crystallographic texture over time to better understand and predict failure of the bearing elements.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

Log of Reference Numerals
Bearing element 5
Computer 10
Monitor 12
X-ray source 15
Detector 20
Holding assembly 25
Adjustment assembly 30

What is claimed is:

1. A method of identifying at least one pole location on a bearing element formed from a metal source element, the method comprising:
   (i) mounting a bearing element in a diffractometer assembly;
   (ii) applying a predetermined X-ray beam to a plurality of regions of the bearing element via an X-ray source, and measuring diffracted intensity values of diffraction vectors of the predetermined X-ray beam at the plurality of regions via a detector; and
   (iii) determining at least one pole location on the bearing element based on the diffracted intensity values, wherein determining the at least one pole location is based on a lowermost diffracted intensity value of the diffracted intensity values.

2. The method according to claim 1, wherein the X-ray diffraction vector is in a normal orientation relative to the plurality of regions of the bearing element during step (ii).

3. The method according to claim 1, wherein the diffracted intensity values are measured at a depth of at least 1 micron from an outer surface of the bearing element and less than 8 microns from the outer surface of the bearing element.

4. The method according to claim 1, wherein the plurality of regions includes at least 60 regions and less than 360 regions.

5. The method according to claim 1, further comprising applying an initial marking to the bearing element prior to step (ii).

6. The method according to claim 1, further comprising rotating the bearing element during step (ii) in a predetermined pattern.

7. The method according to claim 1, wherein the metal source element is a steel cylinder.

8. The method according to claim 1, further comprising mapping the diffracted intensity values at the plurality of regions onto a model of the bearing element, wherein a lowest diffracted intensity value corresponds to the at least one pole location.

9. The method according to claim 8, further comprising marking the bearing element in a location corresponding to the lowest diffracted intensity value mapped on the model of the bearing element.

10. The method according to claim 8, wherein the mapping is configured to map only a first half of the bearing element, and another pole location is determined on a second half of the bearing element based on the mapping of the first half of the bearing element.

11. The method according to claim 1, wherein the diffracted intensity values are measured as at least one of an integrated value or a peak intensity value.

12. The method according to claim 1, wherein the X-ray diffraction vectors are configured to diffract off of a {211} crystallographic plane of the bearing element.

13. The method according to claim 1, wherein the bearing element is intact while identifying the at least one pole location.

14. A method of locating poles on a ball bearing, the method comprising:
(i) applying a predetermined X-ray beam to only one hemisphere of the bearing element via an X-ray source;
(ii) measuring diffracted intensity values of X-ray diffraction vectors from the predetermined X-ray beam across the one hemisphere of the bearing element via a detector;
(iii) mapping the diffracted intensity values onto a model of the ball bearing via a processor; and
(iv) identifying at least one pole location on the bearing element based on the mapping.

15. The method according to claim 14, wherein the method is non-destructive relative to the bearing element.

16. The method according to claim 14, wherein a region of the bearing element having a lowermost diffracted intensity value corresponds to the at least one pole location.

17. The method according to claim 14, wherein step (iv) includes comparing the measured diffracted intensity values against a threshold value, and identifying the at least one pole location in a region corresponding to a measured diffracted intensity value that is less than the threshold value.

18. The method according to claim 14, wherein the X-ray diffraction vectors are in a normal orientation relative to the plurality of regions of the bearing element.

19. A method of identifying at least one pole location on a bearing element formed from a metal source element, the method comprising:
(i) mounting a bearing element in a diffractometer assembly;
(ii) applying a predetermined X-ray beam to a plurality of regions of the bearing element via an X-ray source, and measuring diffracted intensity values of diffraction vectors of the predetermined X-ray beam at the plurality of regions via a detector; and
(iii) determining at least one pole location on the bearing element based on the diffracted intensity values, wherein the diffracted intensity values are measured as at least one of an integrated value or a peak intensity value.

* * * * *